(12) United States Patent
Park et al.

(10) Patent No.: US 8,918,508 B2
(45) Date of Patent: Dec. 23, 2014

(54) METHOD FOR TRANSFERRING RESOURCE AND METHOD FOR PROVIDING INFORMATION

(75) Inventors: Il-gon Park, Seoul (KR); Sung-hyun Cho, Seoul (KR); Min-gyu Chung, Seoul (KR); Man-soo Jeong, Seoul (KR); Koo-yong Pak, Seoul (KR)

(73) Assignee: LG Electronics Inc., Seoul (KR)

( * ) Notice: Subject to any disclaimer, the term of this patent is extended or adjusted under 35 U.S.C. 154(b) by 559 days.

(21) Appl. No.: 12/298,912

(22) PCT Filed: Jan. 7, 2008

(86) PCT No.: PCT/KR2008/000078
§ 371 (c)(1),
(2), (4) Date: Oct. 29, 2008

(87) PCT Pub. No.: WO2008/082281
PCT Pub. Date: Jul. 10, 2008

(65) Prior Publication Data
US 2009/0292809 A1    Nov. 26, 2009

Related U.S. Application Data

(60) Provisional application No. 60/883,607, filed on Jan. 5, 2007, provisional application No. 60/886,557, filed on Jan. 25, 2007, provisional application No. 60/886,726, filed on Jan. 26, 2007, provisional application No. 60/887,952, filed on Feb. 2, 2007, provisional application No. 60/890,933, filed on Feb. 21, 2007.

(51) Int. Cl.
*G06F 15/173* (2006.01)
*G06F 15/16* (2006.01)
*G06F 21/10* (2013.01)

(52) U.S. Cl.
CPC ......... *G06F 21/10* (2013.01); *G06F 2221/0728* (2013.01)
USPC ........... 709/226; 709/223; 709/225; 709/229; 709/230; 709/233; 709/236

(58) Field of Classification Search
USPC .......... 709/223, 225–226, 229–230, 233, 236
See application file for complete search history.

(56) References Cited

U.S. PATENT DOCUMENTS

| | | |
|---|---|---|
| 5,708,812 A | 1/1998 | Van et al. |
| 5,774,668 A | 6/1998 | Choquier et al. |

(Continued)

FOREIGN PATENT DOCUMENTS

| | | |
|---|---|---|
| CN | 1405690 A | 3/2003 |
| CN | 1469583 | 1/2004 |

(Continued)

OTHER PUBLICATIONS

International Search Report dated May 28, 2007 for Application No. PCT/KR007/001112, 2 pages.

(Continued)

*Primary Examiner* — Thu Nguyen
*Assistant Examiner* — Angela Widhalm
(74) *Attorney, Agent, or Firm* — Fish & Richardson P.C.

(57) ABSTRACT

Transmitting a resource and providing information in a resource in a Digital Rights Management (DRM) interoperable system includes: transmitting the resource in a transport session by using at least two handlers; and receiving from the handlers an event message including identification information of the transport session and information which indicates a transfer status of the resource. In addition, the information which indicates the transfer status of the resource may include: a resource index capable of identifying the resource; and information on a transfer status of a resource corresponding to the resource index. Accordingly, information related to transmission of resources can be easily provided in an event form.

8 Claims, 9 Drawing Sheets

(56) References Cited

U.S. PATENT DOCUMENTS

| | | | |
|---|---|---|---|
| 5,862,348 A | 1/1999 | Pedersen | |
| 5,903,566 A * | 5/1999 | Flammer, III | 370/406 |
| 5,991,876 A | 11/1999 | Johnson et al. | |
| 6,006,332 A | 12/1999 | Rabne et al. | |
| 6,044,075 A | 3/2000 | Le Boudec et al. | |
| 6,167,405 A | 12/2000 | Rosensteel et al. | |
| 6,226,618 B1 | 5/2001 | Downs et al. | |
| 6,230,281 B1 | 5/2001 | Brodfuhrer et al. | |
| 6,363,416 B1 | 3/2002 | Naeimi et al. | |
| 6,460,058 B2 * | 10/2002 | Koppolu et al. | 715/738 |
| 6,466,971 B1 | 10/2002 | Humpleman et al. | |
| 6,484,221 B1 | 11/2002 | Lorinser et al. | |
| 6,516,416 B2 | 2/2003 | Gregg et al. | |
| 6,519,656 B2 * | 2/2003 | Kondo et al. | 710/6 |
| 6,549,937 B1 | 4/2003 | Auerbach et al. | |
| 6,600,958 B1 | 7/2003 | Zondag | |
| 6,665,521 B1 | 12/2003 | Gorday et al. | |
| 6,678,791 B1 | 1/2004 | Jacobs et al. | |
| 6,807,542 B2 | 10/2004 | Bantz et al. | |
| 6,807,581 B1 * | 10/2004 | Starr et al. | 709/250 |
| 6,873,975 B1 | 3/2005 | Hatakeyama et al. | |
| 6,944,131 B2 | 9/2005 | Beshai et al. | |
| 6,954,436 B1 | 10/2005 | Yip et al. | |
| 6,993,587 B1 | 1/2006 | Basani et al. | |
| 7,016,963 B1 | 3/2006 | Judd et al. | |
| 7,020,781 B1 | 3/2006 | Saw et al. | |
| 7,032,003 B1 | 4/2006 | Shi et al. | |
| 7,036,011 B2 | 4/2006 | Grimes et al. | |
| 7,062,541 B1 * | 6/2006 | Cannon et al. | 709/219 |
| 7,076,568 B2 * | 7/2006 | Philbrick et al. | 709/250 |
| 7,184,988 B1 | 2/2007 | Frankel et al. | |
| 7,185,113 B1 | 2/2007 | Haberman et al. | |
| 7,213,269 B2 | 5/2007 | Orthlieb et al. | |
| 7,266,616 B1 * | 9/2007 | Munshi et al. | 709/246 |
| 7,328,283 B2 * | 2/2008 | Tan et al. | 709/247 |
| 7,421,578 B1 | 9/2008 | Huang et al. | |
| 7,457,312 B2 * | 11/2008 | Weiss et al. | 370/468 |
| 7,461,130 B1 | 12/2008 | AbdelAziz et al. | |
| 7,484,058 B2 * | 1/2009 | Frey et al. | 711/162 |
| 7,512,973 B1 | 3/2009 | Chan et al. | |
| 7,546,641 B2 | 6/2009 | Robert et al. | |
| 7,549,062 B2 | 6/2009 | Kouznetsov et al. | |
| 7,555,464 B2 | 6/2009 | Candelore | |
| 7,565,438 B1 | 7/2009 | Zhu | |
| 7,577,999 B2 | 8/2009 | Narin et al. | |
| 7,624,072 B2 | 11/2009 | Lipsky et al. | |
| 7,664,883 B2 * | 2/2010 | Craft et al. | 709/250 |
| 7,673,008 B2 | 3/2010 | Kojima | |
| 7,680,963 B2 * | 3/2010 | Go et al. | 710/22 |
| 7,720,767 B2 | 5/2010 | Ta et al. | |
| 7,721,111 B2 | 5/2010 | Hug et al. | |
| 7,757,299 B2 | 7/2010 | Robert et al. | |
| 7,845,014 B2 | 11/2010 | Siegel | |
| 7,877,598 B2 | 1/2011 | Schmidt et al. | |
| 8,359,349 B2 * | 1/2013 | Aaltonen et al. | 709/203 |
| 8,429,300 B2 * | 4/2013 | Jeong et al. | 709/246 |
| 2001/0007993 A1 | 7/2001 | Wu | |
| 2001/0027479 A1 | 10/2001 | Delaney et al. | |
| 2001/0052033 A1 | 12/2001 | Bermudez et al. | |
| 2002/0091850 A1 * | 7/2002 | Perholtz et al. | 709/231 |
| 2002/0108050 A1 | 8/2002 | Raley et al. | |
| 2002/0120577 A1 | 8/2002 | Hans et al. | |
| 2002/0143855 A1 | 10/2002 | Traversat et al. | |
| 2002/0144108 A1 | 10/2002 | Benantar | |
| 2002/0144119 A1 | 10/2002 | Benantar | |
| 2002/0157002 A1 | 10/2002 | Messerges et al. | |
| 2002/0184515 A1 | 12/2002 | Oho et al. | |
| 2002/0198845 A1 | 12/2002 | Lao et al. | |
| 2003/0041138 A1 | 2/2003 | Kampe et al. | |
| 2003/0078891 A1 | 4/2003 | Capitant | |
| 2003/0095540 A1 | 5/2003 | Mulligan et al. | |
| 2003/0114163 A1 | 6/2003 | Bickle et al. | |
| 2003/0120840 A1 | 6/2003 | Isozu | |
| 2003/0126086 A1 | 7/2003 | Safadi | |
| 2003/0189947 A1 * | 10/2003 | Beshai | 370/428 |
| 2003/0221014 A1 * | 11/2003 | Kosiba et al. | 709/231 |
| 2004/0003269 A1 | 1/2004 | Waxman et al. | |
| 2004/0003270 A1 | 1/2004 | Bourne et al. | |
| 2004/0057448 A1 * | 3/2004 | Nakamura | 370/428 |
| 2004/0062246 A1 * | 4/2004 | Boucher et al. | 370/392 |
| 2004/0088541 A1 | 5/2004 | Messerges et al. | |
| 2004/0117660 A1 | 6/2004 | Karaoguz et al. | |
| 2004/0128345 A1 | 7/2004 | Robinson et al. | |
| 2004/0151130 A1 | 8/2004 | Beshai et al. | |
| 2004/0158712 A1 | 8/2004 | Lee et al. | |
| 2004/0158731 A1 | 8/2004 | Narin | |
| 2004/0168077 A1 | 8/2004 | Waxman et al. | |
| 2004/0172533 A1 | 9/2004 | DeMello | |
| 2004/0174817 A1 | 9/2004 | Jabri et al. | |
| 2004/0230982 A1 | 11/2004 | Wookey | |
| 2004/0236717 A1 | 11/2004 | Demartini et al. | |
| 2004/0248561 A1 | 12/2004 | Nykanen et al. | |
| 2004/0249943 A1 | 12/2004 | Venkata | |
| 2004/0254993 A1 | 12/2004 | Mamas | |
| 2005/0003806 A1 | 1/2005 | Bazin et al. | |
| 2005/0021556 A1 | 1/2005 | Noguchi et al. | |
| 2005/0022033 A1 | 1/2005 | Han | |
| 2005/0044391 A1 | 2/2005 | Noguchi et al. | |
| 2005/0054447 A1 | 3/2005 | Hiroyama et al. | |
| 2005/0055418 A1 | 3/2005 | Blanc et al. | |
| 2005/0065891 A1 | 3/2005 | Lee | |
| 2005/0091507 A1 | 4/2005 | Lee | |
| 2005/0102513 A1 | 5/2005 | Alve | |
| 2005/0144468 A1 | 6/2005 | Northcutt et al. | |
| 2005/0172045 A1 | 8/2005 | Bermudez et al. | |
| 2005/0182727 A1 | 8/2005 | Robert et al. | |
| 2005/0198359 A1 | 9/2005 | Basani et al. | |
| 2005/0201301 A1 | 9/2005 | Bridgelall | |
| 2005/0223415 A1 | 10/2005 | Oho et al. | |
| 2005/0228858 A1 | 10/2005 | Mizutani et al. | |
| 2005/0265555 A1 | 12/2005 | Pippuri | |
| 2005/0267845 A1 | 12/2005 | Oh | |
| 2005/0268090 A1 | 12/2005 | Saw et al. | |
| 2005/0289076 A1 | 12/2005 | Lambert | |
| 2006/0013158 A1 | 1/2006 | Ahuja et al. | |
| 2006/0015502 A1 | 1/2006 | Szucs | |
| 2006/0026691 A1 | 2/2006 | Kim | |
| 2006/0047775 A1 * | 3/2006 | Bruck et al. | 709/217 |
| 2006/0080529 A1 | 4/2006 | Yoon et al. | |
| 2006/0133335 A1 | 6/2006 | Garcia-Martin | |
| 2006/0168451 A1 | 7/2006 | Ishibashi et al. | |
| 2006/0190403 A1 | 8/2006 | Lin et al. | |
| 2006/0190521 A1 | 8/2006 | Kojima | |
| 2006/0218419 A1 | 9/2006 | Iwamura et al. | |
| 2006/0272026 A1 | 11/2006 | Niwano et al. | |
| 2007/0027814 A1 | 2/2007 | Tuoriniemi | |
| 2007/0078777 A1 | 4/2007 | Demartini et al. | |
| 2007/0083610 A1 | 4/2007 | Treder et al. | |
| 2007/0093255 A1 | 4/2007 | Nurminen et al. | |
| 2007/0094145 A1 | 4/2007 | Ta et al. | |
| 2007/0100701 A1 | 5/2007 | Boccon-Gibod et al. | |
| 2007/0156603 A1 | 7/2007 | Yoon et al. | |
| 2007/0198656 A1 | 8/2007 | Mazzaferri et al. | |
| 2007/0208574 A1 | 9/2007 | Zheng et al. | |
| 2007/0220302 A1 | 9/2007 | Cline et al. | |
| 2007/0233891 A1 * | 10/2007 | Luby et al. | 709/231 |
| 2007/0242821 A1 | 10/2007 | Kim et al. | |
| 2007/0255659 A1 | 11/2007 | Yen et al. | |
| 2007/0266198 A1 | 11/2007 | Bousis | |
| 2007/0269044 A1 | 11/2007 | Bruestle | |
| 2008/0120362 A1 | 5/2008 | Kapoor et al. | |
| 2008/0137528 A1 | 6/2008 | O'Toole et al. | |
| 2008/0216177 A1 | 9/2008 | Yokosato et al. | |
| 2008/0229387 A1 | 9/2008 | Baks et al. | |
| 2008/0256368 A1 | 10/2008 | Ross et al. | |
| 2009/0190496 A1 | 7/2009 | Mohamed-Rasheed et al. | |
| 2009/0228988 A1 | 9/2009 | Jeong et al. | |
| 2009/0235330 A1 | 9/2009 | Byun et al. | |
| 2009/0248848 A1 | 10/2009 | Jeong et al. | |
| 2009/0307387 A1 | 12/2009 | Jeong et al. | |
| 2010/0257370 A1 | 10/2010 | Yoon et al. | |

(56) References Cited

U.S. PATENT DOCUMENTS

FOREIGN PATENT DOCUMENTS

| | | | |
|---|---|---|---|
| CN | 1610914 A | | 4/2005 |
| EP | 1748598 | | 1/2007 |
| EP | 1564621 B1 | | 9/2009 |
| JP | 8-202568 | | 8/1996 |
| JP | 9-149435 | | 6/1997 |
| JP | 2000-276424 | | 10/2000 |
| JP | 2001-117809 | | 4/2001 |
| JP | 2002-152301 A | | 5/2002 |
| JP | 2002-516652 | | 6/2002 |
| JP | 2003-110556 | | 4/2003 |
| JP | 2003-152820 | | 5/2003 |
| JP | 2003-169091 | | 6/2003 |
| JP | 2003-242124 | | 8/2003 |
| JP | 2004-023327 | | 1/2004 |
| JP | 2004-110816 | | 4/2004 |
| JP | 2004-110817 | | 4/2004 |
| JP | 2004-171544 | | 6/2004 |
| JP | 2004-302817 | | 10/2004 |
| JP | 2005-092872 | | 4/2005 |
| JP | 2005-100030 | | 4/2005 |
| JP | 2005-117631 | | 4/2005 |
| JP | 2005-123686 | | 5/2005 |
| JP | 2005-129058 | | 5/2005 |
| JP | 2005-514716 | | 5/2005 |
| JP | 2005-182145 | | 7/2005 |
| JP | 2005-526330 | | 9/2005 |
| JP | 2007-312328 | | 11/2007 |
| KR | 2004-0034165 | | 4/2004 |
| KR | 10-2005-0039522 | | 4/2005 |
| KR | 2005-0032856 | | 4/2005 |
| KR | 2005-0037483 | | 4/2005 |
| KR | 2005-0077881 | | 8/2005 |
| KR | 2005101940 A | | 10/2005 |
| KR | 2005-0104182 | | 11/2005 |
| KR | 2005-0120579 | | 12/2005 |
| KR | 2006011763 A | | 2/2006 |
| RU | 2260918 C2 | | 9/2005 |
| RU | 2265961 C2 | | 12/2005 |
| WO | 98/24223 | | 6/1998 |
| WO | WO0250787 A1 | | 6/2002 |
| WO | WO 03/034313 | | 4/2003 |
| WO | WO 03/036441 | | 5/2003 |
| WO | WO 03/058620 | | 7/2003 |
| WO | WO 03/073760 | | 9/2003 |
| WO | WO03107602 A1 | | 12/2003 |
| WO | WO 2004/031950 | | 4/2004 |
| WO | WO 2004/059478 | | 7/2004 |
| WO | WO 2004/102459 | | 11/2004 |
| WO | 2005/010763 | | 2/2005 |
| WO | WO 2005/034424 | | 4/2005 |
| WO | WO 2005041001 A1 | | 5/2005 |
| WO | 2005/101831 | | 10/2005 |
| WO | WO 2006/011768 | | 2/2006 |
| WO | WO 2006/011768 A1 | | 2/2006 |
| WO | WO 2006/043784 | | 4/2006 |
| WO | 2006092840 | | 9/2006 |

OTHER PUBLICATIONS

International Search Report dated Jun. 14, 2007 for Application No. PCT/KR2007/001111, 2 pages.
International Search Report dated Jun. 15, 2007 for Application No. PCT/KR2007/001113, 2 pages.
International Search Report dated Jun. 15, 2007 for Application No. PCT/KR2007/001114, 2 pages.
International Search Report dated Jun. 18, 2007 for Application No. PCT/KR2007/001110, 2 pages.
International Search Report dated Jun. 20, 2007 for Application No. PCT/KR2007/001115, 2 pages.
International Search Report dated Jul. 2, 2007 for Application No. PCT/KR200700116, 2 pages.
International Search Report dated Apr. 21, 2008 for Application No. PCT/KR2008/000078, 2 pages.
U.S. Non-final Office Action dated Jun. 29, 2010 for U.S. Appl. No. 12/281,633, 25 pages.
Russian Office Action in Application No. 2008145043/09 dated Apr. 30, 2010, with English translation, 7 pages.
International Search Report and Written Opinion dated Sep. 6, 2007 for Application No. PCT/KR2007/004317, 6 pages.
U.S. Non-final Office Action in U.S. Appl. No. 12/347,426 dated Aug. 18, 2010, 21 pages.
U.S. Non-final Office Action in U.S. Appl. No. 12/281,634 dated Sep. 20, 2010, 26 pages.
Russian Office Action in Application No. 2008145043 dated Aug. 18, 2010, with English translation, 14 pages.
U.S. Non Final Office Action issued in U.S. Appl. No. 12/346,487, dated Nov. 12, 2010, 32 pages.
Australian Office Action dated Nov. 23, 2010 for AU Patent Application No. 2007293790, 2 pages.
China Office Action dated Nov. 10, 2010 for Application No. 200880000253.1, with English translation, 11 pages.
U.S. Office Action dated Oct. 29, 2010 for U.S. Appl. No. 12/346,644, 13 pages.
U.S. Office Action dated Dec. 10, 2010 for U.S. Appl. No. 12/281,633, 17 pages.
U.S. Office Action dated Dec. 21, 2010 for U.S. Appl. No. 12/281,638, 21 pages.
U.S. Notice of Allowance dated Jan. 24, 2011 for U.S. Appl. No. 12/347,426, 5 pages.
UPnP; "Universal Plug and Play Device Architecture"; Jun. 8, 2000; Microsoft Corporation; Version 1.0; pp. 1-54.
WAP; "WAP Push Architectural Overview"; Jul. 3, 2001; WAP Forum; pp. 1-24.
U.S. Office Action dated Feb. 3, 2011 for U.S. Appl. No. 12/281,648, 20 pages.
Final Office Action dated Feb. 4, 2011 for U.S. Appl. No. 12/281,640, 8 pages.
U.S. Notice of Allowance dated Feb. 23, 2011 for U.S. Appl. No. 12/347,426, 9 pages.
Japanese Office Action dated Feb. 22, 2011 with English Translation, 4 pages.
US Final Office Action dated Mar. 23, 2011 for U.S. Appl. No. 12/346,487, 11 pages.
US Final Office Action dated Mar. 23, 2011 for U.S. Appl. No. 12/346,345, 12 pages.
US Non-Final Office Action dated Mar. 18, 2011 for U.S. Appl. No. 12/346,642, 14 pages.
Notice of Allowance issued in U.S. Appl. No. 12/347,426, dated Mar. 31, 2011, 5 pages.
Final Office Action issued in U.S. Appl. No. 12/281,638, dated Apr. 1, 2011, 25 pages.
Office Action issued in U.S. Appl. No. 12/346,668, dated Apr. 5, 2011, 11 pages.
Office Action issued in U.S. Appl. No. 12/347,549, dated Apr. 14, 2011, 14 pages.
Office Action issued in U.S. Appl. No. 12/281,640, dated Apr. 19, 2011, 9 pages.
Final Office Action issued in U.S. Appl. No. 12/346,644, dated Apr. 19, 2011, 10 pages.
Saxena et al., "Admission Control in Peer-to-Peer: Design and Performance Evaluation," 2003; ACM; SASN '03; pp. 1-11.
European Office Action dated Aug. 23, 2011 for Appln. No. 08712540.7, 5 pages.
Office Action issued Jul. 26, 2011 in Japanese Patent Application No. 2009-527301, including English translation, 4 pages.
Final Office Action for U.S. Appl. No. 12/281,648 dated Aug. 4, 2011, 18 pages.
Final Office Action for U.S. Appl. No. 12/346,642 dated Sep. 15, 2011, 16 pages.
Communication issued by the EPO on Sep. 14, 2012 for corresponding EP Patent Application No. 08704618.1; 8 pages.
HDMI, Jan. 2, 2007, XP55017959 URL:http://en.wikipedia.org/w/index.php.?title=HDMI&oldid=97970600; 6 pages.

(56) References Cited

OTHER PUBLICATIONS

Non-final Office Action for U.S. Appl. No. 12/281,647 dated Oct. 14, 2011, 12 pages.
Final Office Action for U.S. Appl. No. 12/295,868 dated Oct. 13, 2011, 14 pages.
Office Action issued Oct. 18, 2011 in Japanese Patent Application No. 2008-558196, including English translation, 7 pages.
Office Action issued Oct. 18, 2011 in Japanese Patent Application No. 2008-558198, including English translation, 7 pages.
Notice of Allowance issued Nov. 15, 2011 in Japanese Patent Application No. 2008-558200, with English Translation, 6 pages.
Final Office Action for U.S. Appl. No. 12/347,549 dated Nov. 22, 2011, 12 pages.
Katsuyasu, Sotoyama, et al., "Techno College TCP/IP Protocol Lectyure," Nikkei Network, No. 67, Japan, Nikkei Business Publications, Inc., Oct. 21, 2005, with English Translation, pp. 120-125.
Non-final Office Action for U.S. Appl. No. 12/281,633 dated Nov. 25, 2011, 18 pages.
U.S. Office Action dated Feb. 18, 2011 for U.S. Appl. No. 12/281,650, 12 pages.
U.S. Final Office Action dated Mar. 2, 2011 for U.S. Appl. No. 12/281,634, 12 pages.
Suresh Singh et al.; Electing Leaders Based Upon Performance: the Delay Model; IEEE; 2001; p. 464-471.
Office Action issued Apr. 21, 2011 in Australian Patent Application No. 2007293790, 2 pages.
Office Action issued May 20, 2011 in Chinese Patent Application No. 2007800071819, including English translation, 7 pages.
Office Action issued May 24, 2011 in Japanese Patent Application No. 2008-558196, including English translation, 6 pages.
Office Action issued May 24, 2011 in Japanese Patent Application No. 2008-558197, including English translation, 4 pages.
Office Action issued May 31, 2011 in Japanese Patent Application No. 2008-558202, including English translation, 7 pages.
Office Action issued Jun. 7, 2011 in Japanese Application No. 2009-537096, including English translation, 5 pages.
Office Action issued Jun. 7, 2011 in Japanese Patent Application No. 2008-558198, including English translation, 7 pages.
Notice of Allowance issued Jun. 14, 2011 in Japanese Patent Application No. 2008-558201, 3 pages.
Notice of Allowance issued in U.S. Appl. No. 12/347,426 dated May 12, 2011, 11 pages.
Non-final Office Action mailed Apr. 14, 2011 in U.S. Appl. No. 12/295,868, 13 pages.
Non-final Office Action mailed May 10, 2011 in U.S. Appl. No. 12/298,914, 23 pages.
Non-final Office Action mailed Jul. 11, 2011 in U.S. Appl. No. 12/346,487, 11 pages.
Tsunoda, S., "The emergence of Ubiquitous Era, Overall JAVA technology supporting ubiquitous," JAVA Press, Japan, Jun. 18, 2005, vol. 42, p. 225.
Office Action issued Oct. 26, 2011 in Japanese Patent Application No. 2009-534512, including English translation, 5 pages.

* cited by examiner

METHOD FOR TRANSFERRING RESOURCE AND METHOD FOR PROVIDING INFORMATION

TECHNICAL FIELD

The present invention relates to a method of transmitting resources and a method of providing information. More particularly, the present invention relates to a data transfer method and an information providing method related to a technique by which information can be easily provided through an event in a Digital Rights Management (DRM) interoperable environment.

BACKGROUND ART

In general, Digital Rights Management (DRM) is a general resource protection technique by which illegal copy and illegal use of digital resources are prevented so that only legitimate users can use the digital resources. The DRM provides an overall protection framework throughout production and distribution of the digital resources. For example, in the DRM, a digital resource is converted to data which is encrypted in a packet format by using an encryption technique so that the digital resource cannot be used without a legal authentication process.

By interacting with a variety of resource service models, the DRM has become a foundation for a reliable and legal resource service. Currently, in practice, a service provider uses a unique DRM to protect its own resource. For example, in a case of a music-source service for providing a music source through on-line communication, the music source is encrypted in a specific encryption pattern to prevent illegal copying, and thus the music source can be reproduced only by the use of an application provided by a corresponding service provider.

However, due to technical and political closure features of the DRM, interoperability is generally impossible between different DRMs. Therefore, a resource provided by one service provider cannot be used with an application provided by another service provider. This has been noted as an important problem which actually restricts a general-purpose use of a DRM resource and thus obstructs the spread of markets for legal contents.

Recently, to deal with the above problem, there is an attempt to provide a framework in which the closed DRM structures are compatible with one another, and a representative example thereof is a DRM interoperable system. The DRM interoperable system may be a system which intermediately controls different DRMs so that a resource or a license can be exchanged to be used.

The DRM interoperable system is implemented by defining system resources and by forming operation models which generate and manage the defined system resources. In particular, it is regarded that critical factors in the implementation of the DRM interoperable system include reliable authentication and management for a client, effective transmission of a resource and a license, and effective information management.

DISCLOSURE OF INVENTION

Technical Problem

The present invention provides a resource transfer method, in which a plurality of resources can be transmitted using a single transport session and a transfer status of each resource can be received through an event, in a Digital Rights Management (DRM) interoperable environment.

The present invention also provides a resource transfer method capable of providing information on a transfer status of each resource through a specific event when a plurality of resources are transmitted in a DRM interoperable environment.

The present invention also provides an information providing method capable of providing information related to a resource or a license to a specific entity through an event.

Technical Solution

According to an aspect of the present invention, there is provided a method of transmitting a resource in a DRM interoperable system. The method may include: transmitting the resource in a transport session by using at least two handlers; and receiving from the handlers an event message including identification information of the transport session and information which indicates a transfer status of the resource. In this case, the information which indicates the transfer status of the resource may include: a resource index capable of identifying the resource; and information on a transfer status of a resource corresponding to the resource index. In addition, the resource may be at least one in number, and the event message may include at least one piece of information which indicates the transfer status of the resource.

In addition, the transmitting of the resource may include: receiving a message which requests the resource to be transmitted to a destination; forming a chain including at least two handlers for performing the transmission; and transmitting to the handlers a message for requesting operation of the handlers, and allowing the resource to be transmitted in the transport session.

In addition, the message for requesting transmission of the resource to a destination may include: transport session information capable of identifying the transport session; source information which indicates a source for transmitting the resource; and destination information which indicates the destination to which the resource is transmitted.

In addition, the at least two handlers may include: a resource exporter that exports the resource requested to be transmitted; and a resource import that receives the resource transmitted from the resource exporter. In addition, the at least two handlers may include: a resource exporter that exports the resource requested to be transmitted; a resource transformer that transforms the resource transmitted from the resource exporter into a resource format required by the destination and then transmits the transformed resource; and a resource importer that receives the resource transmitted from the resource transformer.

In addition, the message which requests the resource to be transmitted to a destination may be received from the client. In this case, the method may further include transmitting to the client an event message in response to the reception of the event message.

In addition, the method may further include subscribing to an event capable of receiving the event message by requesting the handler to subscribe to the event. In addition, the method may further include: gathering information from the plurality of handlers; and determining whether to perform the requested transmission according to the gathered information.

According to another aspect of the present invention, there is provided a method of providing information. The method may include: receiving from a control entity a message including identification information on a transport session and information capable of identifying at least one resource; establishing a Secure Authenticated Channel (SAC) by using a receiving entity designated by the received message; transmitting the at least one resource through the established SAC; and transmitting to the control entity an event message including the identification information on the transport session and information indicating a transfer status of the resource. In addition, the received message may be at least one of a resource export request message, a resource transformation request message, and a resource import request message.

In addition, the method may further include: receiving from the control entity a request message which requests subscription to a specific event capable of receiving the event message; and determining the validity of the request, and, if the request is valid, transmitting to the control entity a response message which indicates that the subscription to the event is permitted.

According to another aspect of the present invention, there is provided a method of providing information. The method may include: receiving from a specific entity a request message which requests subscription to an event capable of receiving a predetermined event message; determining the validity of the request, and, if the request is valid, transmitting to the control entity a response message which indicates that the subscription to the event is permitted; and transmitting the event message to the specific entity. In this case, the event message may be either a resource-transfer-status event message including information on the transfer status on each resource or an update license event message including updated content of a neutral license.

In addition, when the event message is the license event message, the event message may include the neutral license, and the neutral license may include change field information which indicates which part of the neutral license changes and change status information which indicates how a portion indicated by the change field information changes. In addition, the response message may include a unique subscription identifier.

Advantageous Effects

According to the present invention, when a plurality of resources are transmitted using a single transport session in a Digital Rights Managements (DRM) interoperable environment, information on a transfer status of each resource can be provided in a specific event form. In particular, since the information on the transfer status of each resource can be provided by using one event message, information can be further effectively provided. In addition, information indicating where and how a neutral license has changes can be provided when an update event of the neutral license occurs, thereby improving convenience in license management.

BRIEF DESCRIPTION OF THE DRAWINGS

The above and other features and advantages of the present invention will become more apparent by describing in detail exemplary embodiments thereof with reference to the attached drawings in which.

REFERENCE NUMERALS

Figure 1:
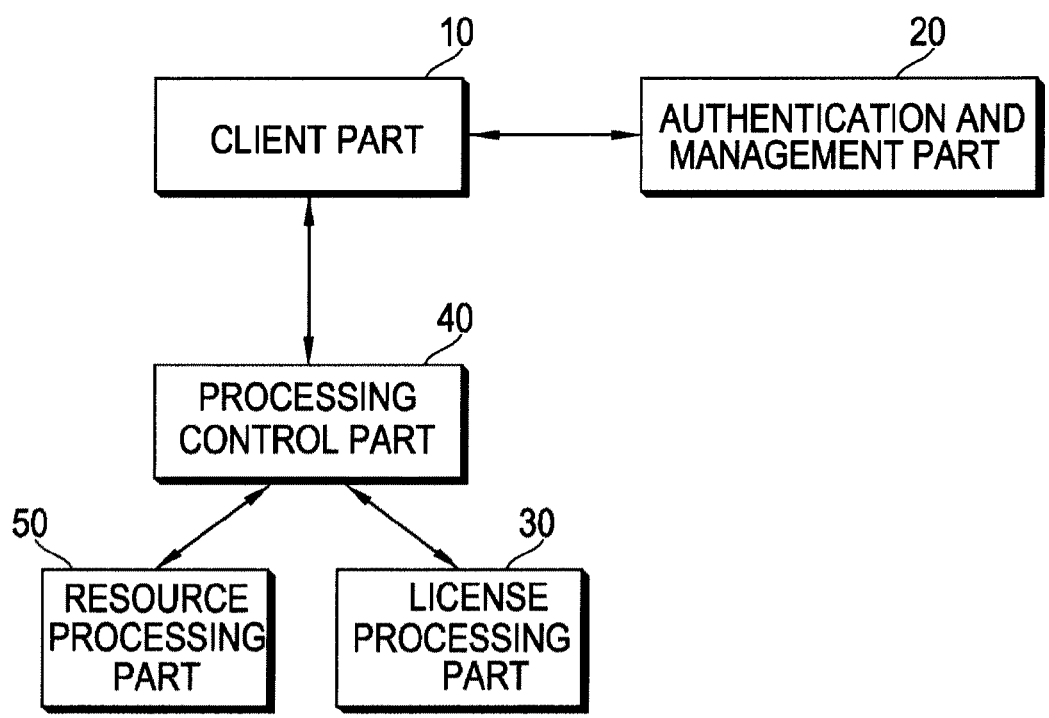
FIG. 1 is a block diagram of a Digital Rights Management (DRM) interoperable system for implementing a resource transfer method or the like according to an embodiment of the present invention.

DV1: request device
DV2: destination device
RC1: request client
RC2: destination client
41: resource processing controller
51: resource transformer
52: resource exporter
53: resource importer

MODE FOR THE INVENTION

Preferred embodiments of the present invention will be described below with reference to the accompanying drawings so that the present invention can be easily implemented by those skilled in the art. In describing the preferred embodiment of the invention illustrated in the drawings, specific terminology is used for the sake of clarity. However, the invention is not intended to be limited to the specific terms so selected, and each specific term includes all technical equivalent terms for steps or items operating in a similar manner to accomplish a similar purpose.

FIG. 1 is a block diagram of a Digital Rights Management (DRM) interoperable system for implementing a resource transfer method or the like according to an embodiment of the present invention.

As shown in FIG. 1, the DRM interoperable system may include a client part 10, an authentication and management part 20, a processing control part 40, a resource processing part 50, and a license processing part 30.

The aforementioned parts 10 to 50 may be constructed of one or more entities. The entities may be modules or devices embodied as software or hardware for performing a specific unique function. The entities may be a set of one or more unit function modules which perform a specific unit function. Each entity may be installed or embodied in a specific device to communicate with another entity through a predetermined interface. Even if these entities belong to the same part, the entities may be installed or embodied in different devices. The devices in which the entities are installed may vary depending on an operating environment.

The client part 10 may include a client. The client is an entity which provides various functions so that a user can use a DRM interoperable service by interacting with the authentication and management part 20 and the processing control part 40. The client may be included in a device of the user. The device which includes the client will be referred to as a client device.

The client may request the authentication and management part 20 to authenticate the client. The authenticated client may request the processing control part 40 to transmit data (e.g., a resource or a license) to a desired destination by calling a specific entity of the processing control part 40. Further, the client may include typical functions of the client, for example, a function for using (or reproducing) a resource, a user interface function, and so on. In this case, the client may be an end point in consumption of the resource.

A main function of the authentication and management part 20 is to authenticate the client and to manage authentication information. To facilitate this function, the authentication and management part 20 may use the concept of a domain.

The domain is a basic unit of a DRM trust framework and may indicate a range to which the DRM interoperable system is applied in practice. The domain may be constructed of a set of authorized devices or systems. For example, the domain may include a set of authorized client devices. In this case, even if the client devices in the domain have different DRM resources, the client devices can share the resources with one another.

Figure 2:
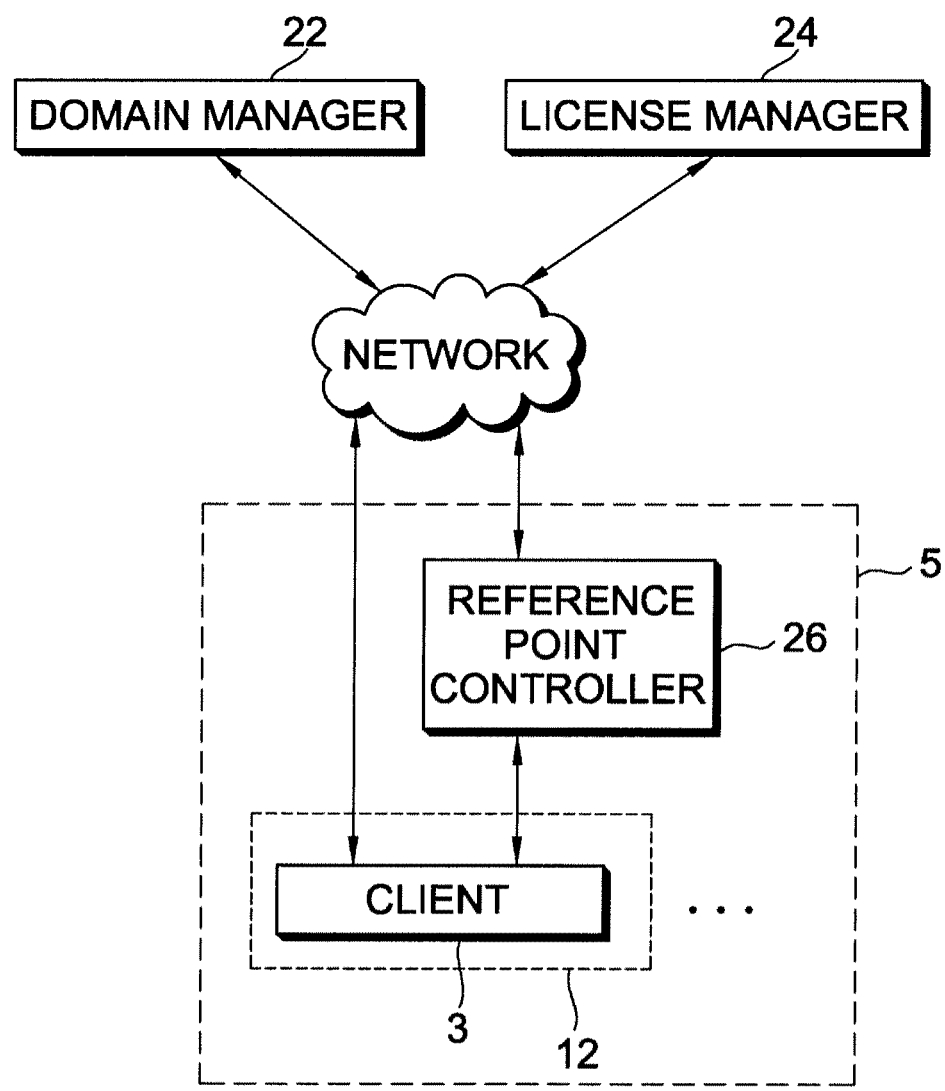
FIG. 2 is a block diagram illustrating a domain, entities which constitute the domain, and correlation between the entities.

FIG. 2 is an exemplary block diagram illustrating a domain, entities which constitute the domain, and correlation between the entities. The illustration of FIG. 2 focuses on entities related to authentication and management of a client in a DRM interoperable system.

Referring to FIG. 2, the DRM interoperable system forms a domain 5. The domain 5 may be formed in consideration of a physical location of a client device 12 in which a client 3 is installed. For example, the domain is formed by authenticated client devices existing in a specific physical area. Alternatively, the domain may be formed by only logically authenticated client devices without considering the physical location of the client device 12.

The present invention will be described by taking an example in which, as mentioned above, the domain is constructed of the client devices 12 exiting in a specific local area in consideration of the physical location of the client device 12, and client devices existing in a network area other than the local area can be registered to the domain. However, this is only an exemplary embodiment, and thus the present invention is not limited thereto.

A local environment is required in order to form the domain 5. The local environment indicates an environment where a physical network is provided so that devices existing in a specific local area can interact with one another and where the physical network can interact with an external network. For example, the local environment may be a home network system.

A local area which will be referred hereinafter is assumed to be an area in which the local environment is formed. For example, the local area may be a user's house equipped with a home network system, a place in which at least two or more devices can be connected through local networking, and so on. Further, a network area is assumed to be an area of a Wide Area Network (WAN) side such as the wired/wireless Internet.

As shown in FIG. 2, the authentication and management part 20 for authenticating or managing the client 3 may include a domain manager 22, a license manager 24, and a reference point controller 26.

The domain manager 22 is an entity which performs a function for managing the domain 5. For example, the domain manager 22 may perform various functions, for example, for creating the domain 5, for destroying the domain 5, for associating clients with the domain 5, for removing clients from the domain 5, and for registering the domain reference point 26.

The domain manager 22 may exist at any location in a local area or a network area. For example, in the example shown in FIG. 2, the domain manager 22 is located in the network area. In this case, the domain manager 22 may interact with the reference point controller 26 and the client 3 through the Internet or the like. Alternatively, the domain manager 22 may be located in the local area. In this case, the domain manager 22 may be included in a device located in the local area.

The license manager 24 manages user license information. For example, the license manager 24 can provide a user login function and perform a typical online manager function which stores and manages the user license information. The license manager 24 can perform functions for creating user names, for deleting user names, for associating license information with user names, for creating license information, for deleting license information, and so on.

The license manager 24 may be disposed in the network area, for example, a service provider's side. However, the location of the license manager 24 is not limited to the network area. Thus, the license manager 24 may exist in the local area. That is, the domain manager 22 and the license manager 24 may be located in any location in the local area or the network area.

The reference point controller 26 verifies whether a specific entity (e.g., client, etc.) exists in the local area, and provides the verified entity with a credential which confirms that the specific entity is located in the local area. For this function, the reference point controller 26 can determine a range of the local area. The range of the local area may be determined, for example, by using a physical distance, the number of hops, a response time, and so on.

The reference point controller 26 verifies whether the client 3 exists in the local area at the request of the client 3. If it is verified that the client 3 properly exists in the local area, the reference point controller 26 can provide a domain credential which confirms that the client 3 is located in the local area. The domain credential may be sent to the domain manager 22 when the client 3 requests the domain manager 22 to authenticate the client 3. The domain manager 22 reads the received domain credential and confirms that the client 3 properly exists in the local area. Then, the domain manager 22 can authenticate the client 3. Of course, in addition to such methods, the client 3 may be authenticated by the domain manager 22 by receiving typical user information or a certificate.

The reference point controller 26 is included in the local area. That is, the reference point controller 26 may be included in a device exiting in the local area. Further, the reference point controller 26 may be selected through a specific process when the domain is initially formed. For example, the reference point controller 26 may be designated by the domain manager 22 or may be automatically selected by exchanging a message between devices existing in the local area.

Meanwhile, the client 3 which is certified to the domain 5 requests the processing control part 40 to transmit data (i.e., a resource or a license), and the processing control part 40 controls the resource processing part 50 or the license processing part 30 so that the requested data can be transmitted.

Figure 3:
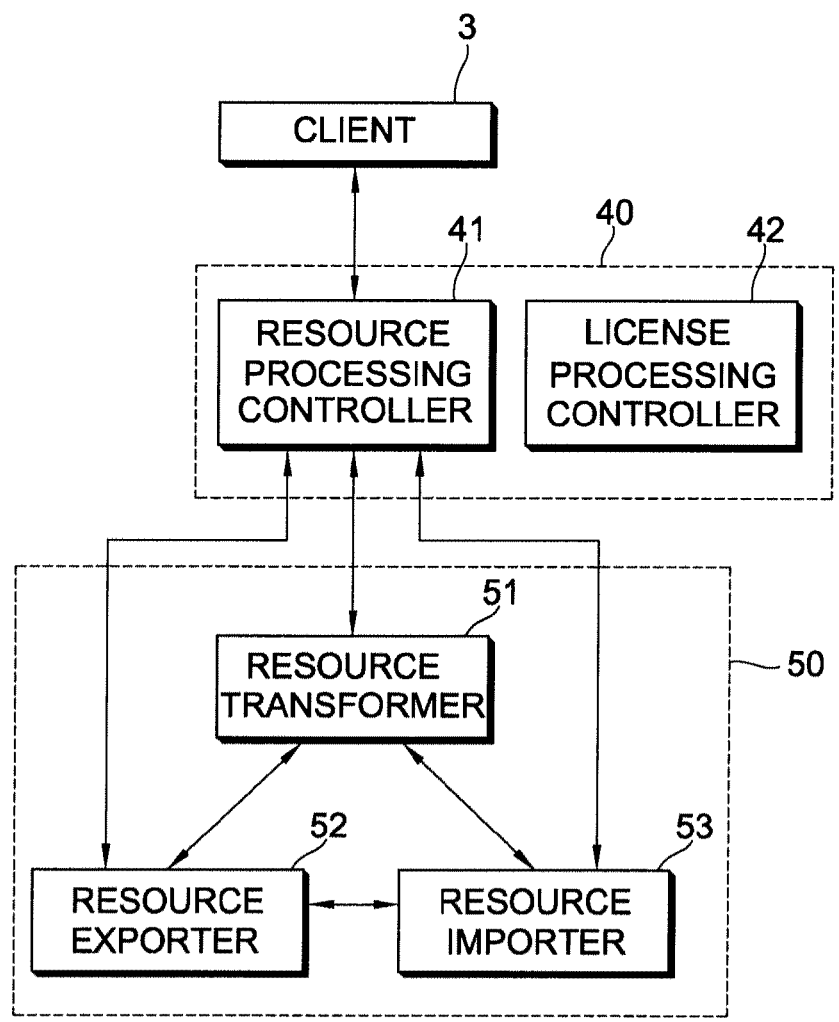
FIG. 3 is a block diagram illustrating a detailed structure of a processing control part and a resource processing part which are used in transmission of resources.

FIG. 3 is a block diagram illustrating a detailed structure of the processing control part 40 and the resource processing part 50 which are used in transmission of resources. Entities participating in a resource transmission process are shown in FIG. 3.

Referring to FIG. 3, the processing control part 40 includes a resource processing controller 41 and a license processing controller 42. Since the license processing controller 42 is not related to transmission of resources, details thereof will be described later.

The resource processing controller 41 may receive from the client 3 a request for requesting transmission of one or a plurality of resources to a specific destination. The resource processing controller 41 controls the resource processing part 50 so that the resources are transmitted according to the received resource transmission request. The resource processing controller 41 may exist in any location in the local area or the network area, and preferably, in devices existing within the local area.

The resource processing part 50 transmits the resources from a source to a destination under the control of the resource processing controller 41. The resource processing part 50 includes a plurality of resource handlers. A resource handler may be an entity which performs a function related to transmitting and processing of the resources. The resource handler includes a resource exporter 52, a resource transformer 51, and a resource importer 53.

The resource exporter 52 can perform a function for exporting a resource which is requested to be transmitted by the resource processing controller 41 and for transmitting the exported resource to the resource transformer 51 or the resource importer 53 in a neutral resource format. The neutral resource may be a clean resource which is not encrypted by using a specific DRM. The resource requested by the resource processing controller 41 may be a resource encrypted by using the specific DRM. The resource exporter 52 may fetch the requested resource from a source side, convert the resource into a neutral resource by decoding the resource by using its own function, and then transmit the resultant resource. Alternatively, the resource exporter 52 may receive the neutral resource, which has already been decoded in the source side, and then transmit the received neutral resource.

The resource transformer 51 receives the neutral resource transmitted from the resource exporter 52 and converts the received neutral resource into a signal having a required format, and then transmits the signal to the resource importer 53. The required format may be a format required in the destination. The resource transformer 51 participates in the transmission only when the format of the neutral resource has to be converted.

The resource importer 53 receives the neutral resource transmitted from the resource transformer 51 or the resource exporter 52, and provides the received neutral resource to the destination. In this case, the resource importer 53 may provide the received neutral resource to the destination without encryption, or may provide the received neutral resource to the destination after encrypting the neutral resource to have a format suitable to a DRM applied to the destination. In the former case, the destination may use the neutral resource provided from the resource importer 53 after encrypting the neutral resource by using its own function so that the neutral resource conforms to the DRM applied to the resource importer 53. In the latter case, the resource importer 53 may use the neutral resource without encryption since the neutral resource is provided in a state of being encrypted by the resource importer 53.

Figure 4:
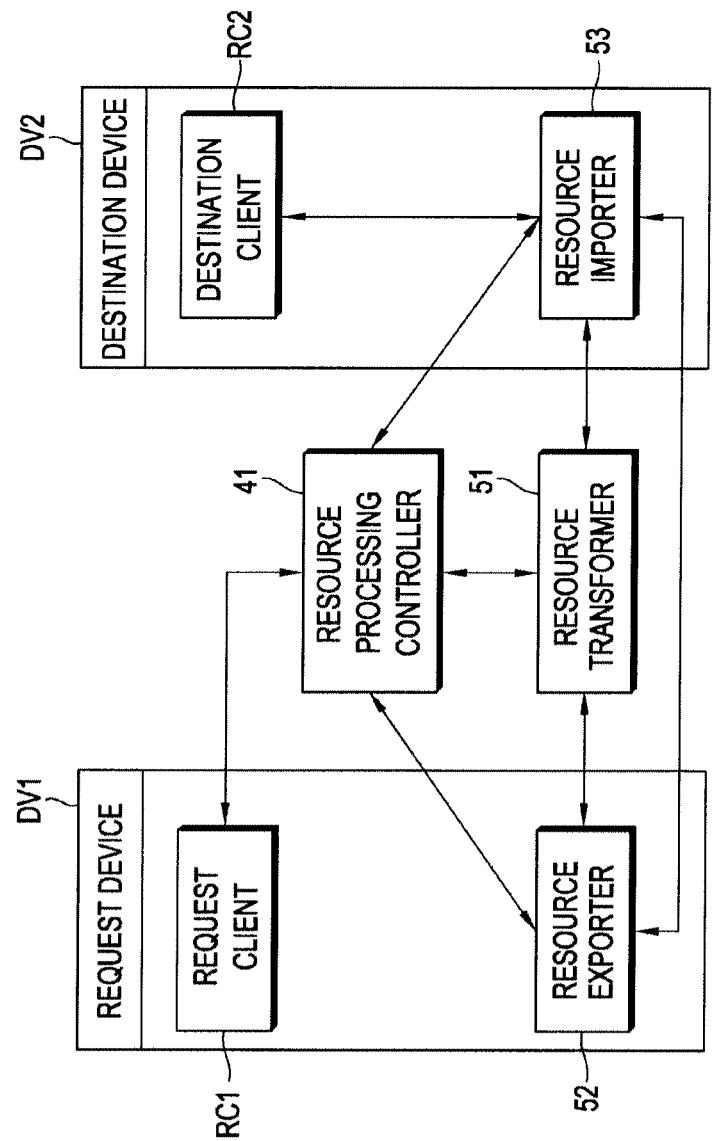
FIG. 4 is a block diagram illustrating an example of locations of a resource processing controller and resource handlers.

FIG. 4 is a block diagram illustrating an example of locations of the resource processing controller 41 and the resource handlers 51 to 53

As shown in FIG. 4, the resource exporter 52 may be included in a request device DV1, and the resource importer 53 may be included in a destination device DV2. In addition, the resource processing controller 41 or the resource transformer 51 may be included in other devices different from the request device DV1 and the destination device DV2.

The request device DV1 may be a client device which requests transmission of a resource. The request device DV1 may include a request client RC1 which requests transmission of the resource. A specific DRM may be installed in the request device DV1. When the resource stored in the request device DV1 is intended to be transmitted, the request device DV1 acts as a source.

The destination device DV2 may be a destination (e.g., a client device or a specific system) to which the resource requested to be transmitted by the request client RC1 is transmitted. The destination device DV2 may include a destination client RC2. A destination DRM may be installed in the destination device DV2. The destination DRM may be equal to or different from that installed in the request device DV1.

The locations of the resource processing controller 41 and the resource handlers 51 to 53 are shown in FIG. 4 for exemplary purpose only. Thus, the resource processing controller 41 and the resource handlers 51 to 53 may be included in the same device, or some of these elements may be included in the same device, or all of these elements may be respectively included in separate devices. For example, the resource processing controller 41 may be included in the request device DV1 or the destination device DV2, or the resource transformer 51 and the resource processing controller 41 may be included in the same device.

As such, the resource processing controller 41, the resource exporter 52, the resource transformer 51, and the resource importer 53 are not limited in location to a specific device, and thus may be located in various positions. Preferably, however, for security reasons, the resource exporter 52 may be included in the request device DV1, and the resource importer 53 may be included in the destination device DV2. Accordingly, the present invention will hereinafter be described by employing the structure of FIG. 4.

Figure 5:
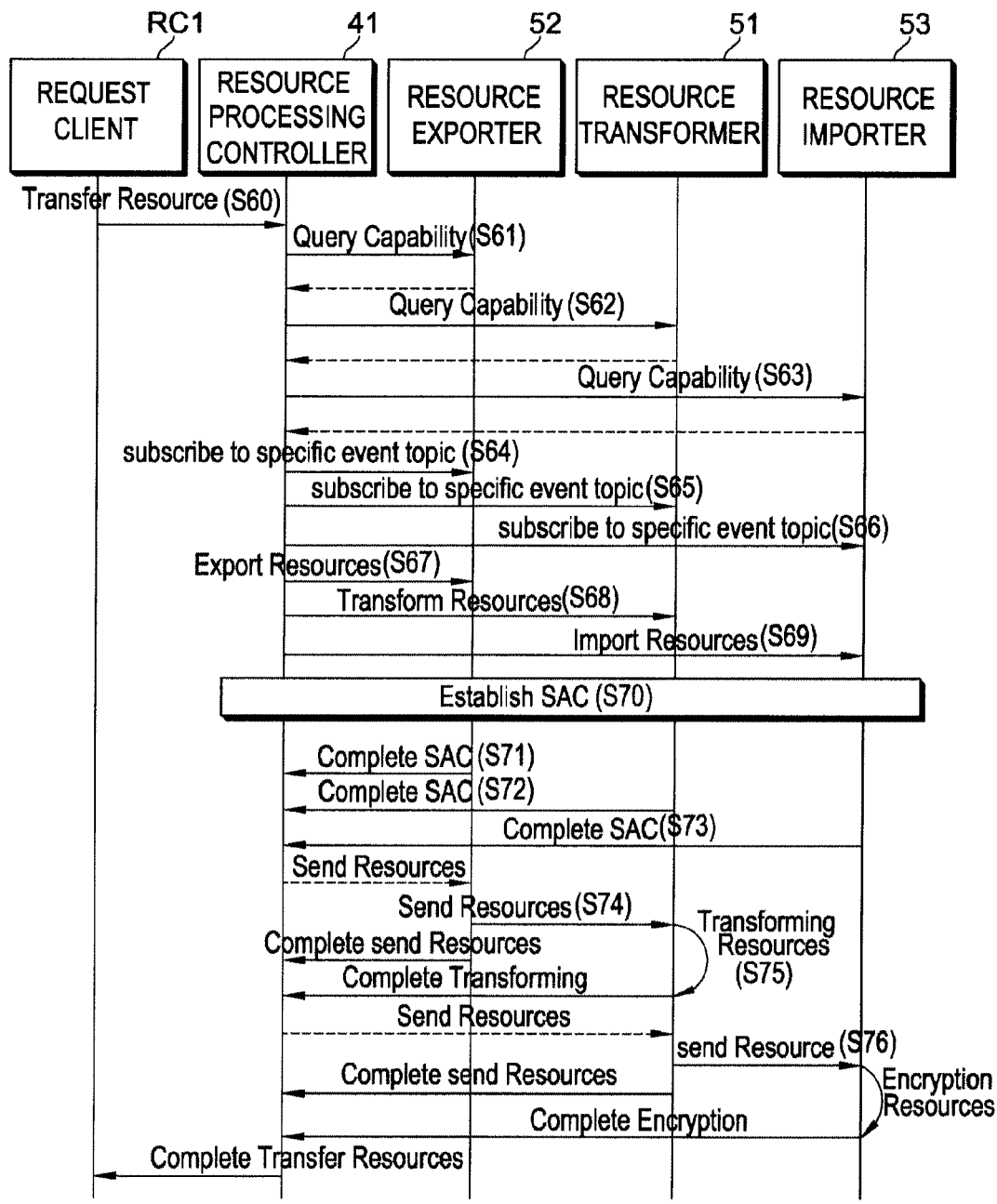
FIG. 5 is a flow diagram illustrating a process for transmitting a resource by using a resource processing controller and resource handlers.

FIG. 5 is a flow diagram illustrating a process for transmitting a resource by using the resource processing controller 41 and the resource handlers 51 to 53. Specifically, FIG. 5 illustrates an example of a process for transmitting a plurality of resources included in the request device DV1 to the destination device DV2 that is a destination.

Referring to FIG. 5, the request client RC1 transmits to the resource processing controller 41 a resource transmission request message which requests transmission of a plurality of resources, and the resource processing controller 41 receives the resource transmission request message (step S60).

In this case, the resource transmission request message may include a transport session IDentifier (ID), resource chain information, source information, destination information, and so on. Optionally, the resource transmission request message may further include DRM system information of a destination that receives the resource.

The resource chain information may be information which can identify a plurality of resources requested to be transmitted. Herein, a resource chain may be a set of resources formed of one or a plurality of resources. Since a plurality of resources are transmitted as an example in the present invention, it is assumed that the number of resources included in the resource chain is a plural number. However, the present invention is not limited thereto. Thus, if one resource is intended to be transmitted, the resource chain may include only one resource. The resource chain information may include information which can identify each resource included in the resource chain requested to be transmitted.

The transport session ID may be an identifier which can uniquely identify a transport session. The transport session ID is used to identify the transport session when a specific operation is performed, for example, when transmission of resources is canceled or when an event message indicating a transfer status of a resource is transmitted.

The source information may be information which can identify from where the plurality of resources requested to be transmitted are transmitted. The source information may include an identifier capable of identifying a source device or system (e.g., the request device in the present embodiment), information on a file format of a resource requested to be transmitted, and so on.

The destination information may be information which can recognize a destination (e.g., the destination device in the present embodiment) to which the requested plurality of resources are transmitted. The destination information may include a destination identifier capable of identifying a destination, information on a file format required in the destination, and so on. The file format information included in the destination information may be used when the file format is transformed by the resource transformer 51.

Upon receiving the resource transmission request message from the request client RC1, the resource processing controller 41 gathers information of the resource handlers located in the system (steps S61, S62, and S63). For example, the resource processing controller 41 queries at least one or more resource exporters 52, the resource importers 53, and the resource transformers 51 for their capabilities, and then receives a response from the corresponding entity. Accordingly, the capabilities of source, intermediary, and destination devices, systems, and DRMs, each of which involves in the transmission of resources, can be recognized.

Upon gathering the information, the resource processing controller 41 determines whether the requested resource is transmitted according to the gathered information. The resource processing controller 41 may examine whether the requested resource can be transmitted by considering a format of the requested resource, a system policy, information on a Secure Authenticated Channel (SAC) algorithm executable between entities, and so on. For example, if the gathered capability of the resource transformer 51 cannot support transformation of a resource format into a required resource format, the resource cannot be transmitted. On the contrary, the resource can be transmitted when the requested resource format can be supported. The resource processing controller 41 may determine whether to transmit the resource by considering the aforementioned factors.

When it is determined that the resource is transmitted, the resource processing controller 41 forms a resource transformation chain constructed of the resource handlers 51 to 53 that can effectively perform requested processes. For example, the resource processing controller 41 determines the resource handlers 51 to 53 (e.g., the resource exporter 52, the resource transformer 51 (optional), and the resource importer 53) that can effectively perform the requested resource transformation on the basis of the gathered information, and controls the resource handlers 51 to 53 to form the resource transformation chain.

The resource transformation chain may or may not include the resource transformer 51. This is because, when a format of a resource requested to be transmitted is different from that of a resource required in the destination, the format of the transmitted resource has to be transformed by the resource transformer 51, while when the format of the resource requested to be transmitted is the same as that of the resource required by the destination, the format of the transmitted resource does not have to be transformed.

The transformation of the resource format may be codec transformation. For example, if the requested resource is compressed with MPEG-2, and a resource format that can be used in the destination is MPEG-4, then the resource having the MPEG-2 format cannot be used in the destination. Thus, the MPEG-2 resource has to be transformed to have the MPEG-4 format by using the resource transformer 51. It will be assumed in the present invention that a requested resource format is different from a resource format required in the destination, and thus resource transformation is necessary. In this case, the resource transformation chain has to include the resource transformer 51.

The resource processing controller 41 sends operation control messages to the respective resource handlers 51 to 53 included in the resource transformation chain (steps S67, S68, and S69). For example, the resource processing controller 41 respectively sends a resource export request message, a resource transformation request message, and a resource import request message to the resource exporter 52, the resource transformer 51, and the resource importer 53.

The resource export request message may include a transport session ID, resource chain information, receiver information, and so on. The receiver information may be information on a receiver that can export a resource and transmit the resource. In the present invention, since the resource transformation chain includes the resource transformer 51, the receiver information may be identification information of the resource transformer 51. However, if the resource transformation chain does not include the resource transformer 51, the receiver information may be identification information of the resource importer 53.

The resource transformation request message may include a transport session ID, resource chain information, transmitter information, receiver information, format information of a resource to be transmitted, information on a transformed format, and so on. The transmitter information and the receiver information may be information which can identify an entity for transmitting a resource and an entity for receiving the resource. That is, the transmitter information may be identification information of the resource exporter 52, and the receiver information may be identification information of the resource importer 53.

The resource import request message may include a transport session ID, resource chain information, transmitter information, and so on. The transmitter information is information which can identify a transmitter for transmitting a resource. In the present invention, the transmitter information may be identification information of the resource transformer 51. However, if the resource transformer 51 does not exist in the resource chain, the transmitter information may be identification information of the resource exporter 52. When resource import is requested, the transmitter information may include information on a receiver that finally receives a resource (i.e., destination information) and DRM system information of the destination.

The transport session ID included in the operation control messages (i.e., the resource export request message, the resource transformation request message, and the resource import request message) is information corresponding to the transport session ID included in the resource transmission request message previously received from the request client RC1. That is, the transport session ID included in the operation control messages is practically identical to the transport session ID included in the resource transmission request message.

The resource chain information included in the operation control messages corresponds to the resource chain information included in the resource transmission request message received from the request client RC1. Therefore, since the resource chain information includes identification information of a plurality of resources, the plurality of resources identified by the resource chain information can be transmitted within one transport session which is identified by the transport session ID.

As such, when the resource exporter 52, the resource transformer 51, and the resource importer 53 respectively receive the resource export request message, the resource transformation request message, and the resource import request message from the resource processing controller 41, Secure Authenticated Channels (SACs) are established between the resource exporter 52 and the resource transformer 51 and between the resource transformer 51 and the resource importer 53 (step S70). In this case, a security method used in a TCP/IP transport layer such as Transport Layer Security (TLS) may be used in the establishment of the SAC.

In response to the resource export request message, the resource exporter 52 establishes the SAC with respect to the resource transformer 51 so that a resource requested to be transmitted can be securely transmitted to a receiver, i.e., the resource transformer 51. Further, in response to the resource transformation request, the resource transformer 51 transforms a resource transmitted from the resource exporter 52, and then establishes the SAC for transmitting the resource to the resource importer 53. Meanwhile, in response to the resource import request, the resource importer 53 may establish the SAC for transmitting the resource transmitted from the resource transformer 51 to the destination device DV2 (i.e., an end-point in transmission of the resource). This may be further effective when the resource importer 53 is installed in another device different from the destination device DV2.

Accordingly, the SAC is established along a path starting from the resource exporter 52 to the resource importer 53 via the resource transformer 51. In addition thereto, in order to provide the resource to a final end-point, the resource importer 53 may establish the SAC among a path starting from the resource importer 53 to the end-point. The respective resource handlers report to the resource processing controller 41 that the SACs have been completely established (steps S71, S72, and S73).

Upon completing the establishment of the SACs, the resource is transmitted from the resource exporter 52 (step S74). In this case, a pair of coupled resource handlers (i.e., resource exporter 52-resource transformer 51 and resource transformer 51-resource importer 53) supports a multi-transport protocol. The multi-transport protocol enables transmission of multi-resources in a single transport session. This protocol may also support a variable frame size. Accordingly, a plurality of resources can be transmitted in the single transport session.

Figure 6:
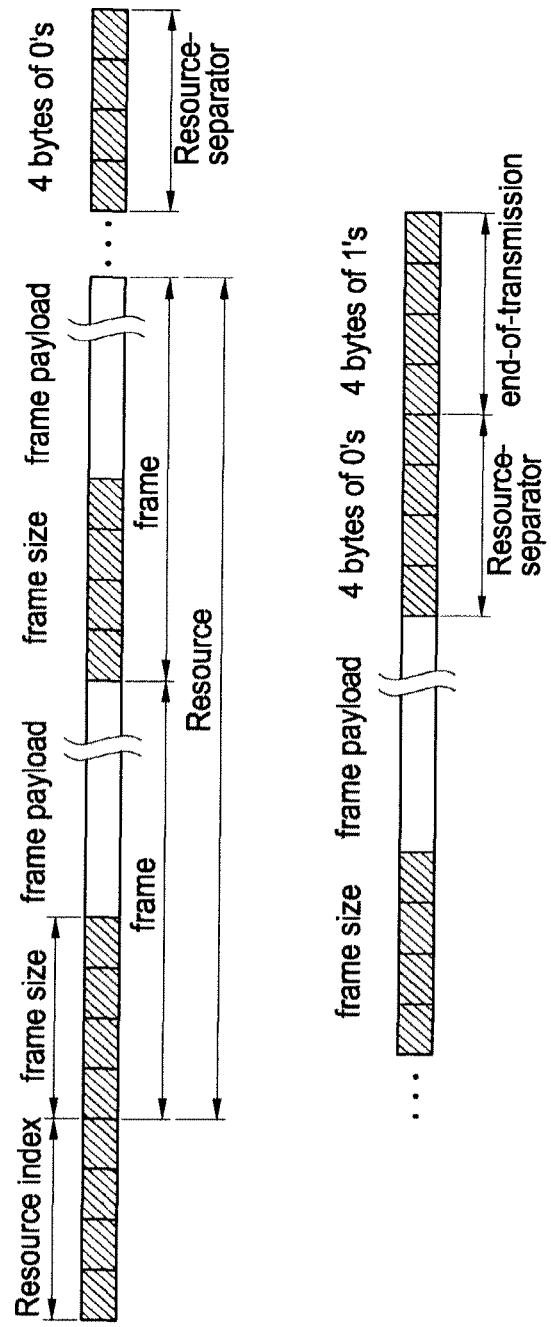
FIG. 6 illustrates an example of a multi-transport protocol.

FIG. 6 illustrates an example of a multi-transport protocol.

As shown in FIG. 6, a plurality of resources may be sent in a single transport session. A resource index is inserted into a header of each resource. The resource index may be a value with predetermined bits (e.g., four bits) for identifying each resource. The resource index is a factor which is used to distinguish the respective resources, which are transmitted during corresponding transport sessions, from one another by associating with the requested resources. Further, a resource separator is inserted to the end of each resource to identify the resources. For example, the resource separator may be constructed of four bits of 'O'.

Each resource may be divided into a plurality of frames according to a length thereof. A frame size with specific bits (e.g., four bits) is inserted to the header of each frame, followed by a frame payload for loading data. Meanwhile, an End-Of-Transmission (EOT) is inserted to the end of each session to indicate the end of transmission. The EOT may be four bits of '1'.

Since the multi-transport protocol is supported as mentioned above, a plurality of resources can be sent in one transport session corresponding to the transport session ID provided by the request client RC1. Such transmission is sequentially made starting from the resource exporter 52. That is, the resource exporter 52 sends the requested plurality of resources to the resource transformer 51 through the SAC (step S74). The resource transformer 51 receives the resources and transforms the resources so that the resources have a format required in the destination (step S75). After the resource for mat is transformed, the resource transformer 51 transmits the transformed resources to the resource importer 53 through the SAC (step S76). Then, the resource importer 53 receives the transformed resources and transmits the received resources to the destination device DV2.

The resources transmitted from the resource exporter 52 to the resource importer 53 via the resource transformer 51 may be neutral resources. The resource exporter 52 may export the requested plurality of resources, transform the exported resources into the neutral resources, and transmit the neutral resources. Alternatively, the resource exporter 52 may export neutral resources, which have been previously transformed, and transmit the neutral resources. This process may be performed by considering a policy or an export procedure determined by the DRM system used in the requested resources.

The resource importer 53 can transmit the received neutral resources to the destination device DV2 by considering a policy or an import procedure determined by the DRM system used in the destination device DV2. For example, the received neutral resources may be encrypted to conform to a destination DRM and then provided to the destination device DV2. Alternatively, the received neutral resources may be transmitted to the destination device DV2 without encryption.

Meanwhile, the resource exporter 52, the resource transformer 51, and the resource importer 53 can report a resource transfer status to the resource processing controller 41. For this, the resource processing controller 41 has to subscribe to a specific event so as to receive the resource transfer status (steps S64, S65, and S66). The specific event will be referred to as a resource-transfer-status event.

The resource processing controller 41 can request the subscription to the resource-transfer-status event before the operation control messages are transmitted. For example, the resource processing controller 41 requests the resource exporter 52, the resource transformer 51, and the resource importer 53 to subscribe to the resource-transfer-status event. Then, the resource exporter 52, the resource transformer 51, and the resource importer 53 examine the validity of the request, and, if the request is valid, send a response message to allow the subscription to the event. However, if the request is invalid, the event subscription may be denied. The response message may include a subscription identifier. Accordingly, the resource processing controller 41 can subscribe to the resource-transfer-status event.

The resource processing controller 41 is an event subscription entity, and the resource handlers 51 to 53 are event issuing entities. The event subscription entity may be an entity which subscribes to an event for receiving information. The event issuing entity may be an entity which transmits an event message to the event subscription entity.

Upon subscribing to the resource-transfer-status event, the resource processing controller 41 receives an event message which includes information on a transfer status of a resource in a push or pull method. In the push method, the resource handlers automatically push the event message (including resource-transfer-status information) whenever the transfer status of the resource changes. Thus, the transfer status of the resource can be automatically provided to the resource processing controller 41. In the pull method, the resource processing controller 41 fetches the event message from the resource handlers when required.

When the subscription to the resource-transfer-status event is requested, the resource processing controller 41 informs a corresponding resource handler that whether the resource-transfer-status information is received in the push method or the pull method. It will be described in the present invention that the resource processing controller 41 receives the event message including the resource-transfer-status information in the push method as an example.

The resource processing controller 41, which has subscribed to the resource-transfer-status event, can receive the event message including information on the transfer status of the resource transmitted from each resource handler in a specific transport session. In particular, when a plurality of resources are transmitted in the specific transport session, the event message may include information indicating a transfer status of each of the plurality of resources.

Figure 7:
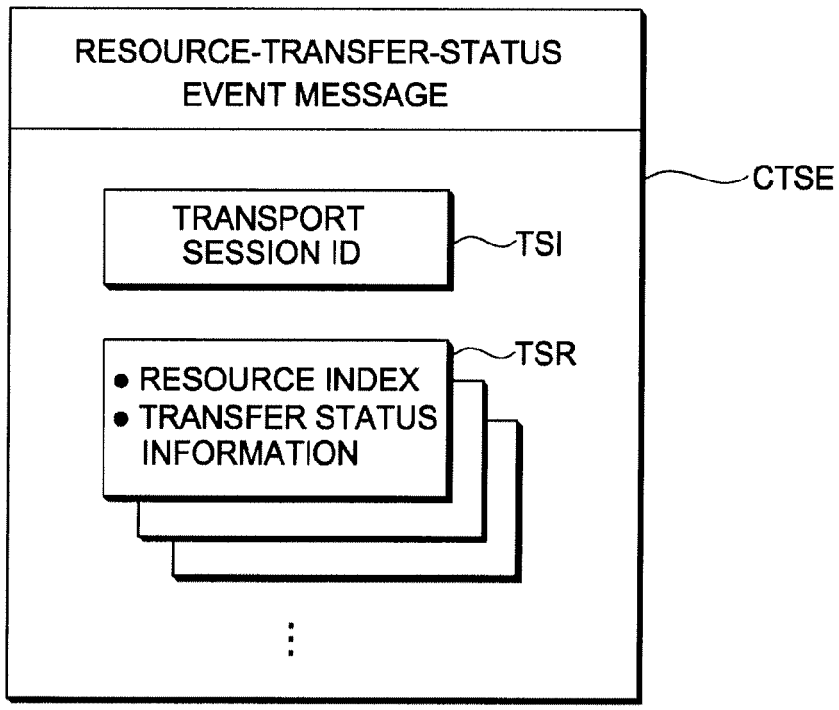
FIG. 7 illustrates an example of a configuration of an event message including resource-transfer-status information.

FIG. 7 illustrates an example of a configuration of the event message including the resource-transfer-status information. When a plurality of resources are transmitted in a single transport session, transfer status information of each resource is included in the event message as shown in FIG. 7.

Referring to FIG. 7, the event message including the resource-transfer-status information will also be simply referred to as CTSE. The CTSE includes a Transport Session Identifier (or also simply referred to as TSI) and a plurality of Transfer Status Reports (or also simply referred to as TSRs).

The TSI is information which identifies a transport session and which corresponds to the transport session ID included in the resource transmission request message received from the request client RC1 or included in the operation control message transmitted by the resource processing controller 41. In other words, the TSI included in the CTSE is information practically equivalent to the transport session ID included in the resource transmission request message or in the operation control message.

Each TSR is information which indicates a transfer status of each resource. The TSR includes a resource index capable of identifying a specific resource from among a plurality of resources. As described above, the resource index is a factor that can identify each resource transmitted in a specific transport session by associating with each resource requested to be transmitted.

In addition, the TSR also includes transfer status information of each resource. The transfer status information may include a started element for indicating the start of transmission of a resource, a completed element for indicating the completion of transmission of the resource, a transfer-error element for indicating a transmission error of the resource, a progress element for indicating ongoing transmission of the resource, and so on.

Therefore, when the plurality of resources are transmitted through the resource transformation chain which is constructed of the resource exporter 52, the resource transformer 51, and the resource importer 53, the resource processing controller 41 can receive information on the transfer status of each resource. As will be described below, such an operation can also apply to a license in the same manner. In the case of the license, the operation may be performed by the license processing controller 42.

Table 1 below shows a configuration of the aforementioned event message including the resource-transfer-status information in a schema format.

TABLE 1

```
<xsd:complexType name="resource-transfer-status-event-type">
    <xsd:complexContent>
        <xsd:extension base="cca:event-type">
            <xsd:sequence>
                <xsd:element name="transfer-session-identifier" type=
                "xsd:base64Binary"/>
                <xsd:element name="status" type="cca:transfer-status-type"
maxOccurs="unbounded"/>
                <xsd:any namespace="##other" processContents="lax"
                minOccurs="0"
maxOccurs="unbounded"/>
            </xsd:sequence>
        </xsd:extension>
    </xsd:complexContent>
</xsd:complexType>
```

Referring to Table 1, the event message including the resource-transfer-status information, that is, resource-transfer-status-event-type includes a TSI (i.e., transfer-session-identifier) and a TSR (i.e., transfer-status-type). The "transfer-status-type" can be represented in a schema format as shown in Table 2 below.

TABLE 2

```
<xsd:complexType name="transfer-status-type">
    <xsd:complexContent>
        <xsd:sequence>
            <xsd:element name="resource-index" type="xsd:positiveInteger"/>
            <xsd:element name="transfer-status"/>
        </xsd:sequence>
    </xsd:complexContent>
</xsd:complexType>
```

Referring to Table 2, the TSR (i.e., "transfer-status-type") may include a "resource-index" for identifying a resource and a "transfer-status" that is transfer status information of the resource.

The resource processing controller 41 may transmit a specific event message to a specific client, e.g., the request client RC1, in response to the received event message including the resource-transfer-status information. In this case, the request client RC1 has to request the resource processing controller 41 to subscribe to the resource-transfer-status event for receiving the resource-transfer-status information. For example, the request client RC1 may request the resource processing controller 41 to subscribe to the resource-transfer-status event when a resource is requested to be transmitted, in order to subscribe to the event. In this case, the request client RC1 is an event subscription entity, and the resource processing controller 41 is an event issuing entity.

In this manner, the request client RC1 can recognize a transfer status of each resource requested to be transmitted. If the request client RC1 has a user interface function, the request client RC1 can inform a user of a resource transfer status in a numerical or graphical form. In particular, when a plurality of resources are transmitted in a single transport session, since the user can recognize the transfer status of each resource, the transfer statuses of requested resources can be sequentially recognized.

Meanwhile, an authenticated client can request the processing controller to send a license. For example, if a first client device installed with a first DRM and a second client device installed with a second DRM are present, and the user intends to transmit a first DRM resource stored in the first client device to the second client device in order to use the first DRM resource, then the first client can transmit a resource to a destination (i.e., the second client device) by using the aforementioned resource transmission processes. In this case, if the second client device intends to use the transmitted resource, a license conforming to the second DRM is required. Therefore, the first client has to request the transmission of the license.

Figure 8:
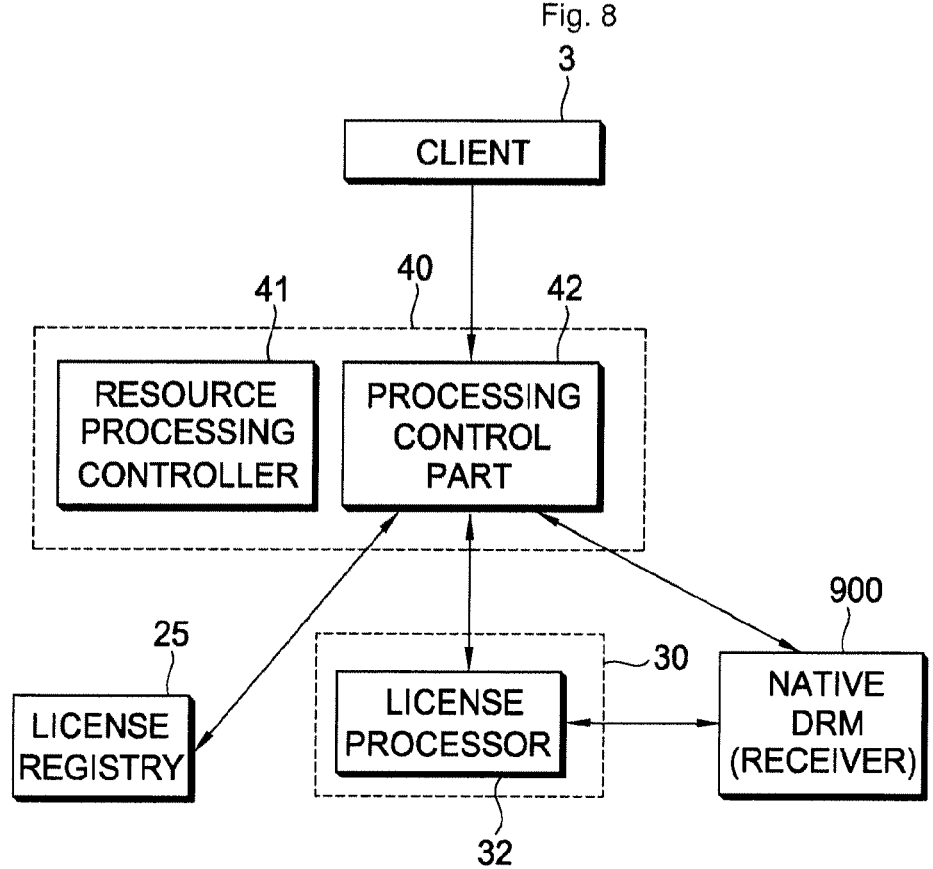
FIG. 8 is a block diagram illustrating a structure of a system related to transmission of licenses.

FIG. 8 is a block diagram illustrating a structure of a system related to transmission of licenses.

Referring to FIG. 8, the processing control part 40 includes the resource processing controller 41 and the license processing controller 42. The resource processing controller 41 has been described above. The resource processing controller 41 and the license processing controller 42 may be provided at any locations in the local area or the network area. The resource processing controller 41 and the license processing controller 42 may be located in separate areas. For example, the resource processing controller 41 may be located in a specific device in the local area, and the license processing controller 42 may be located in a service provider's side in the network area. The resource processing controller 41 and the license processing controller 42 are not particularly limited in location.

The license processing controller 42 receives a license transmission request from the client 3. Upon receiving the license transmission request, the license processing controller 42 can gather information on entities included in a system to determine an entity which participates in transmission or to determine whether transmission is possible. Then, a chain through which a license will be transmitted may be formed under the control of the license processing controller 42.

In addition to the license processing controller 42, a license registry 25, and a license processor 32 of the license processing part 30 can participate in the transmission of the license. These entities for participating in the transmission of the license may be located at any locations in the network area or the local area. Optionally, a Secure Authenticated Channel (SAC) may be established between specific entities to secure transmitted license information.

The license processing controller 42 can request the license registry 25 to transmit one or a plurality of neutral licenses so as to receive the neutral license(s). The neutral license may represent compatible neutral license information which can be used to extract license information on various types of DRMs. The neutral license may be created by using a corresponding DRM license by the license manager 24 when a user purchases a specific DRM resource, and thereafter the neutral license may be stored in the license registry 25. The license registry 25 may exist in the license manager 24 or may exit in the domain manager 22 or the reference point controller 26.

Optionally, the license registry 25 may exist in the client device 12. An entity which provides the neutral license in the transmission of the license may be regarded as a license handler for performing a function of an exporter.

The neutral license may include one or a plurality of resource chain information, manager information, principal information capable of using the license, one or a plurality of usage model information, and so on. The usage model information may be information in which a usage right on a resource is described.

The license processing controller 42 creates a new neutral license to be transmitted in practice by using the provided neutral license. Various types of information may be taken into account herein such as a relationship between a resource and a principal entity for using the resource, a destination, a mapping relation of the principal entities for using the resource, a resource mapping relationship, and so on.

The neutral license created by the license processing controller 42 is transmitted to the license processor 32 of the license processing part 30. The license processor 32 is an entity which transmits the neutral license received from the license processing controller 42 to a native DRM receiver 900 in a destination. In this case, the license processor 32 may transform the received neutral license into a license conforming to a destination DRM according to a method defined in the destination DRM, and provide the transformed license to the native DRM receiver 900. Alternatively, the license processor 32 may provide the neutral license to the native DRM receiver 900 without transformation. In the latter case, the license transformation is performed by the DRM system itself in the destination. It can be regarded that the license processor 32 and the native DRM receiver 900 respectively perform functions of a license converter and a license receiver.

The entities which participate in the transmission of the license can transmit to the license processing controller 42 a license-transfer-status event message to indicate a progress status of transmitting and processing the license. For this, the license processing controller 42 has to subscribe to the license-transfer-status event by requesting a relevant entity to provide the license-transfer-status event message. The license processing controller 42 can provide the client 3 with information corresponding to the received license-transfer-status event message.

Moreover, upon receiving the license-transfer-status event message, the license processing controller 42 can transmit to the client 3 an event message corresponding to the license-transfer-status event message. For this, the client 3 has to request the license processing controller 42 to provide the license-transfer-status event message so as to subscribe to the license-transfer-status event.

Meanwhile, the neutral license has to change its content according to a use of the resource or changes in an environment of using the resource. For example, if the user has reproduced a resource two times so far where the resource can be reproduced five times, the usage model information of the neutral license also updates a reproduction right of the resource to three times of reproduction by considering the fact that the resource has been reproduced two times. In addition, if the user has sent the resource, which can be reproduced five times and is stored in a specific client device, to another client and has also allowed a corresponding client to have two times of reproduction right out of five times of reproduction right, a resource reproduction right of the client device has to be updated to three times of reproduction. Such information update of the neutral license may be performed through an update license event.

Figure 9:
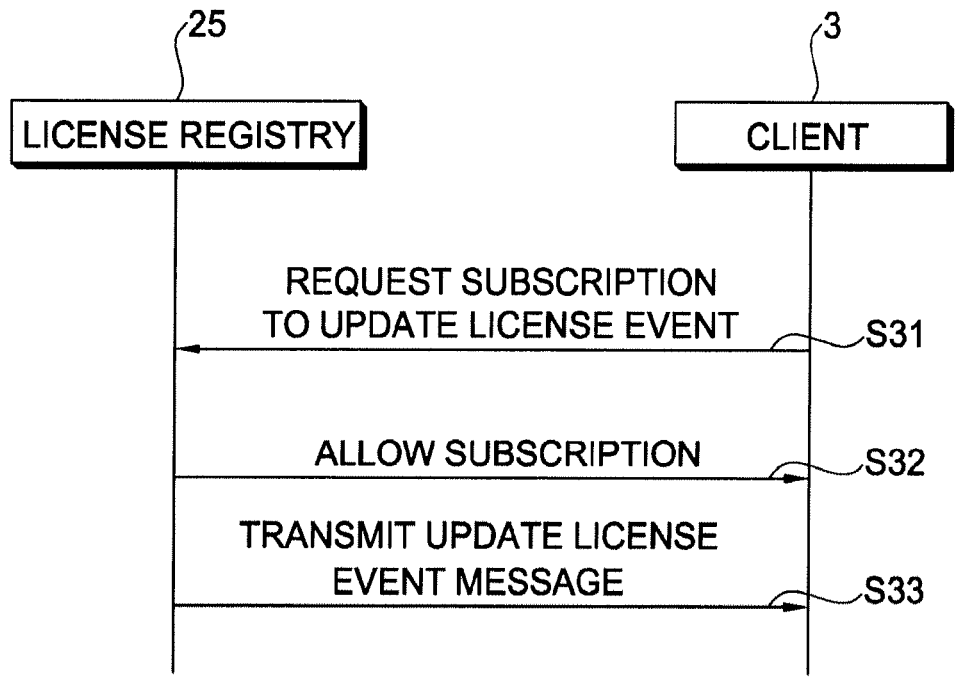
FIG. 9 is a flow diagram illustrating a process for performing an update license event between a license registry and a client.

FIG. 9 is a flow diagram illustrating a process for performing an update license event between a license registry and a client.

Referring to FIG. 9, the client 3 requests the license registry 25 to subscribe to an update license event (step S31). After receiving the request, the license registry 25 determines the validity of the subscription request. If the subscription request is valid, the license registry 25 transmits a response message for allowing the registration (step S32). Herein, if the subscription request is invalid, the subscription to the event may be denied. The response message may include a subscriber identifier. Then, the client 12 acts as an event subscription entity, and the license registry 25 acts as an event issuing entity (step S33).

Thereafter, when information on the neutral license has changes, the license registry 25 transmits to the client 12 an update license event message including update information. Then, the client 12 reads the transmitted update license event message and recognizes that the neutral license information has changed. Then, the client 12 can update the license information.

Figure 10:
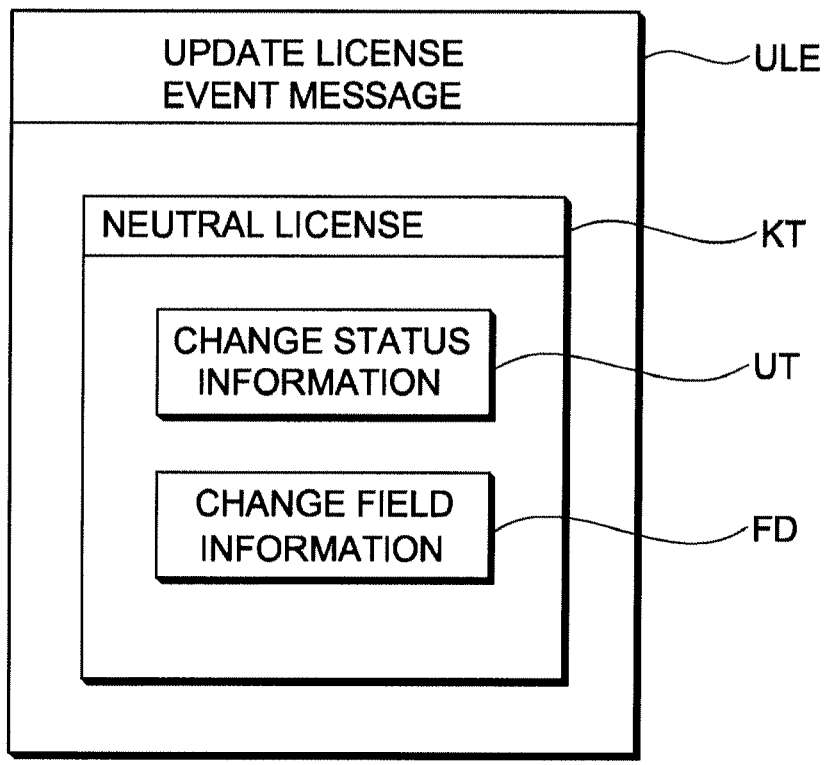
FIG. 10 illustrates an example of a configuration of an update license event message.

FIG. 10 illustrates an example of a configuration of an update license event message.

Referring to FIG. 10, the update license event message ULE includes a neutral license KT. The neutral license KT includes change field information FD and change status information UT in order to indicate where and how the neutral license has changed.

The change field information FD indicates which part of the neutral license KT has changed. Examples of the field information which can be defined in the change field information FD may include manager information, principal information, resource identification information, and usage model information. A specific attribute name is assigned to the change field information FD in the neutral license KT. For example, the change field information FD may have an attribute name of 'field'.

The change status information UT indicates how a portion indicated by the change field information FD has changed in the neutral license KT. Examples of change status which can be indicated by the change status information UT may include information is added (Added), information is removed (Removed), before information is modified (Modified-Old), and after information is modified (Modified-New). A specific attribute name may be assigned to the change status information UT in the neutral license KT. For example, the change status information UT may have an attribute name of 'update'.

For example, regarding the update license event message, if a specific neutral license is included in the update license event message, and an element having an attribute name of 'field' included in the neutral license indicates 'Usage Model', and an element having an attribute name of 'update' indicates 'Modified-New', then the neutral license represents a neutral license obtained after a usage model is updated. In this case, if it is defined that the usage model of the neutral license has a right of reproducing a resource five times, it can be presumed that, even if the usage model can be currently reproduced five times, the number of times of reproducing the resource is previously more than five.

As such, when the client 12 receives the update license event message transmitted from the license registry 25, the client 12 can recognize that the neutral license is updated. In FIG. 10, the client 12 acts as an event subscription entity, and the license registry 25 acts as an event issuing entity. However, this is only an example, and thus the present invention is not limited thereto. Therefore, the update license event may be performed between license registries.

As described above, the license registry may be included in the license manager, the domain manager, the reference point controller, and the client device. That is, the license registry may be provided in a plural number in the DRM interoperable system. Therefore, in order for the plurality of license registries to share information on the neutral license, when there is a change in the information on the neutral license stored in a specific license registry, a corresponding change status has to be delivered to other license registries to update the information. For example, if two license registries are respectively included in a license manger in a service provider's side and a client device of a user, update information on the neutral license can be exchanged after the two license registries subscribe to an update license event.

When the DRM interoperable system is initially implemented, a specific entity can be provided with policy information from another entity. For example, if the domain manager is located in the local area, the domain manager has to receive the policy information from the specific entity installed in the service provider's side. In this case, the specific entity may be a policy provider. The policy provider is an entity which provides the policy information at the request of the specific entity, and may be located in the network area, e.g., the service provider's side. For example, the policy provider may be located in the license manager in a form of a unit function module.

The policy provider can provide the policy information at the request of a specific entity (e.g., the domain manager) or through a specific event.

Figure 11:
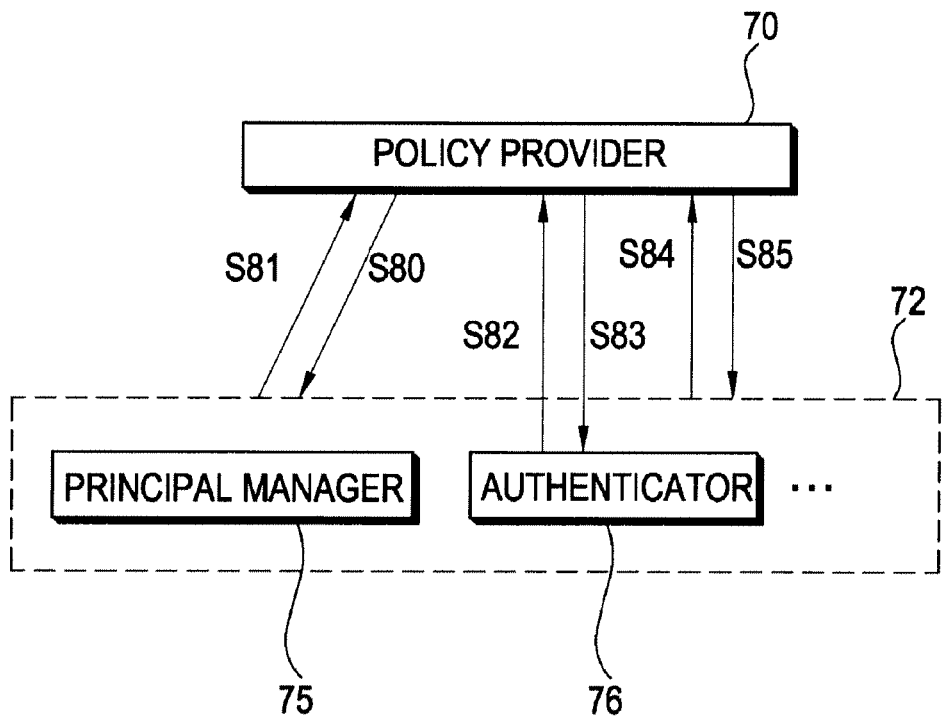
FIG. 11 illustrates an example of a process in which a policy provider provides policy information to a domain manager through a request/response operation.

FIG. 11 illustrates an example of a process in which a policy provider provides policy information to a domain manager through a request/response operation.

Referring to FIG. 11, when a domain manager 72 is located in the local area, a policy provider 70 recognizes the domain manager 72 and thus requests configuration information in order to evaluate a configuration component included in the domain manager 72 (step S80). The domain manager 72 may include a plurality of unit function modules, e.g., an authenticator 76, a principal manager 75, etc. Then, in response to the configuration information, the domain manager 72 transmits to the policy provider 70 the configuration information of the domain manager 72 (e.g., information on the authenticator 76 and the principal manager 75) (step S81).

Upon receiving the configuration information, the policy provider 70 reads the provided configuration information and selects a unit function module that requires a setup of a policy information value. According to a request from the selected unit function module (step S82), the policy provider 70 transmits policy information to a corresponding unit function module (e.g., the authenticator 76 of FIG. 11) (step S83). In addition, when there is a policy request from the domain manager 72 (step S84), the policy provider 70 transmits the policy information to the domain manager 72 in response to the request (step S85).

Meanwhile, the policy provider 70 may provide the policy information by using an update change event to be described below.

Figure 12:
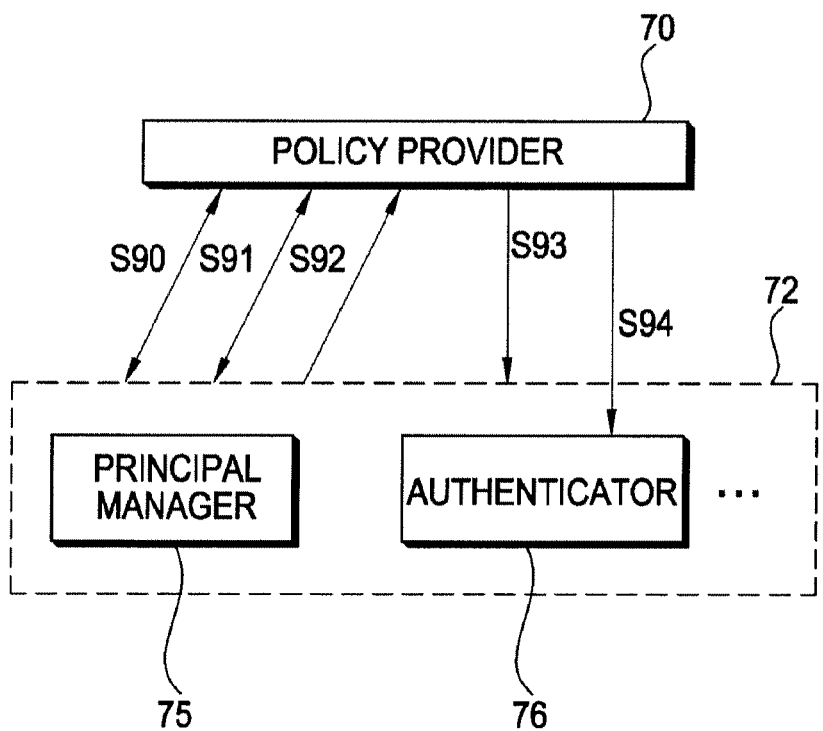
FIG. 12 illustrates an example of a process in which a policy provider provides policy information through an event.

FIG. 12 illustrates an example of a process in which a policy provider provides policy information through an event.

Referring to FIG. 12, when a device including the domain manager 72 is located in the local area, the domain manager 72 requests the policy provider 70 to subscribe to an update change event. The update change event may be an event which transmits changed policy information by using an event message when the policy information changes. According to the subscription request from the domain manager 72, the policy provider 70 allows the subscription by determining the validity of the event subscription request. Therefore, the domain manager 72 subscribes to the update change event (step S90). In this case, the domain manager 72 acts as a subscription entity of the update change event, and the policy provider 70 acts as an issuing entity of the update change event.

Meanwhile, the policy provider 70 requests the domain manager 72 to subscribe to a configuration change event. The configuration change event may be an event which transmits configuration information (e.g., unit function module information) of the event issuing entity by using an event message when the configuration information changes. The domain manager 72 determines the validity of the event subscription request from the policy provider 70, and thus permits the subscription. Then, the policy provider 70 subscribes to the configuration change event (step S91). In this case, the policy provider 70 acts as a subscription entity of the configuration change event, and the domain manager 72 acts as an issuing entity of the configuration change event.

Subsequently, the domain manager 72 transmits, to the policy provider 70, configuration information of the domain manager 72 itself (i.e., information on the authenticator 76 and the principal manager 75) through a configuration change event message (step S92). Then, the policy provider 70 analyzes the received configuration change event message and thus determines policy information corresponding to changed configuration information, and thereafter transmits an update change event message including the corresponding policy information to the domain manager 72 or a unit function module (e.g., the authenticator 76 of FIG. 12) which requires the policy information.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A method for transferring resources, performed by a handler in a DRM interoperable system, the method comprising:
   receiving an operation request message from a controller, which receives a resource transmission request message from a client, the resource transmission request message including a transport session identifier identifying a transport session and resource chain information identifying multiple resources, and the operation request message including the transport session identifier identifying the transport session and the resource chain information identifying the multiple resources,
      wherein the controller is configured to determine whether a transformation of a resource format is to be performed, the determination being made based on destination information included in the resource transmission request message, and
      if the transformation is to be performed, the operation request message includes an identification of a resource transformer that supports the transformation;
   transmitting, based on the received operation request message, the multiple resources in the transport session identified by the transport session identifier based on a transmission protocol that supports transmitting the multiple resources in a single transport session; and
   transmitting an event message to the controller, the event message including information indicating transfer status of the multiple resources and the transport session identifier,
      wherein the information indicating transfer status of the multiple resources includes a resource index identifying each of the resources which is transmitted in the transport session and transfer status information indicating transfer status of the resource corresponding to the resource index.

2. The method of claim 1,
   wherein the transmission protocol supports variable frame sizes, each of the resources is divided into multiple frames, each of the frames has a header that indicates a size of a payload of the respective frame, and the resource index identifying each of resources is inserted before the header of the first frame of each of the resources.

3. The method of claim 1, wherein transfer status information indicating transfer status of the resource corresponding to the resource index includes at least one of: a start element indicating the transmission of a resource corresponding to the resource index has started, a completion element indicating the transmission of a the resource corresponding to the resource index has been successfully completed, a progress-done element indicating progress of the transmission of a the resource corresponding to the resource index, or an error element indicating the transmission of a the resource corresponding to the resource index has resulted in an error.

4. The method of claim 3,
   wherein the transmission protocol supports variable frame sizes, each of the resources is divided into multiple frames, each of the frames has a header that indicates a size of a payload of the respective frame, and the resource index identifying each of resources is inserted before the header of the first frame of each of the resources.

5. A system for transferring resource, in a DRM interoperable system, the system comprising:
   one or more computers;
   a computer-readable medium coupled to the one or more computers having instructions stored thereon which, when executed by the one or more computers, causes the one or more computers to perform operations comprising:
   receiving an operation request message from a controller, which receives a resource transmission request message from a client, the resource transmission request message including a transport session identifier identifying a transport session and resource chain information identifying multiple resources, and the operation request message including the transport session identifier identifying the transport session and the resource chain information identifying the multiple resources
      wherein the controller is configured to determine whether a transformation of a resource format is to be performed, the determination being made based on destination information included in the resource transmission request message, and
      if the transformation is to be performed, the operation request message includes an identification of a resource transformer that supports the transformation;
   transmitting, based on the received operation request message, multiple resources in the transport session identified by the transport session identifier based on a transmission protocol that supports transmitting the multiple resources in a single transport session; and transmitting an event message to the controller, the event message including information indicating transfer status of the multiple resources and the transport session identifier, wherein the information indicating transfer status of the multiple resources includes a resource index identifying each of the resources which is transmitted in the transport session and transfer status information indicating transfer status of the resource corresponding to the resource index.

6. The system of claim 5, wherein the transmission protocol supports variable frame sizes, each of the resources is divided into multiple frames, each of the frames has a header that indicates a size of a payload of the respective frame, and the resource index identifying each of resources is inserted before the header of the first frame of each of the resources.

7. The system of claim 5, wherein transfer status information indicating transfer status of the resource corresponding to the resource index includes at least one of: a start element indicating the transmission of a the resource corresponding to the resource index has started, a completion element indicating the transmission of a the resource corresponding to the resource index has been successfully completed, a progress-done element indicating progress of the transmission of a the resource corresponding to the resource index, or an error element indicating the transmission of a the resource corresponding to the resource index has resulted in an error.

8. The system of claim 7, wherein the transmission protocol supports variable frame sizes, each of the resources is divided into multiple frames, each of the frames has a header that indicates a size of a payload of the respective frame, and the resource index identifying each of resources is inserted before the header of the first frame of each of the resources.

* * * * *